United States Patent
Prodan et al.

(10) Patent No.: US 9,553,744 B2
(45) Date of Patent: Jan. 24, 2017

(54) TWO-DIMENSIONAL (2D) BURST MARKER (BM) TO IDENTIFY DATA START AND STOP

(71) Applicant: BROADCOM CORPORATION, Irvine, CA (US)

(72) Inventors: Richard Stephen Prodan, Niwot, CO (US); Mark Edward Laubach, Redwood City, CA (US); Leo Montreuil, Atlanta, GA (US)

(73) Assignee: BROADCOM CORPORATION, Irvine, CA (US)

( * ) Notice: Subject to any disclaimer, the term of this patent is extended or adjusted under 35 U.S.C. 154(b) by 37 days.

(21) Appl. No.: 14/643,228

(22) Filed: Mar. 10, 2015

(65) Prior Publication Data

US 2015/0256367 A1 Sep. 10, 2015

Related U.S. Application Data

(60) Provisional application No. 61/950,768, filed on Mar. 10, 2014, provisional application No. 62/100,428, filed on Jan. 6, 2015.

(51) Int. Cl.
| | |
|---|---|
| *H04J 14/02* | (2006.01) |
| *H04L 25/40* | (2006.01) |
| *H04L 27/26* | (2006.01) |
| *H04L 1/00* | (2006.01) |
| *H04B 10/2575* | (2013.01) |
| *H04J 14/08* | (2006.01) |
| *H04L 5/00* | (2006.01) |

(52) U.S. Cl.
CPC .......... *H04L 25/40* (2013.01); *H04B 10/2575* (2013.01); *H04J 14/08* (2013.01); *H04L 1/0042* (2013.01); *H04L 5/0007* (2013.01); *H04L 5/0039* (2013.01); *H04L 5/0048* (2013.01); *H04L 27/2602* (2013.01); *H04L 27/2613* (2013.01); *H04L 27/2627* (2013.01); *H04L 27/2656* (2013.01); *H04L 27/2692* (2013.01)

(58) Field of Classification Search
CPC .......... H04J 4/00; H04J 14/08; H04B 10/2575
See application file for complete search history.

(56) References Cited

U.S. PATENT DOCUMENTS

| | | | |
|---|---|---|---|
| 2009/0086670 A1* | 4/2009 | Hart | H04W 72/042 370/329 |
| 2012/0195401 A1* | 8/2012 | Becker | H04B 1/109 375/368 |
| 2014/0099113 A1* | 4/2014 | Fang | H04Q 11/0067 398/66 |

* cited by examiner

*Primary Examiner* — Dzung Tran
(74) *Attorney, Agent, or Firm* — Garlick & Markison; Shayne X. Short

(57) ABSTRACT

A communication device includes a communication interface and a processor configured to generate, transmit, receive, and process signals. The communication device generates orthogonal frequency division multiplexing (OFDM) frame(s) that include a two-dimensional (2D) start burst marker (BM), a data payload, and a 2D stop BM, and transmits the OFDM frame(s) to another communication device. Alternatively, the communication device receives OFDM frame(s) that include a 2D start BM and a 2D stop BM, and then identifies a data payload within those OFDM frame(s) based on the 2D start burst marker and a 2D stop BM. The 2D start and stop BMs are based on predetermined sequences having particular formats based on corresponding 2D sub-carrier and OFDM/A frame based structure. A receiver communication device then detects the 2D start BM and 2D stop BM within the received OFDM frame(s) based on knowledge of these predetermined sequences and particular formats.

20 Claims, 10 Drawing Sheets

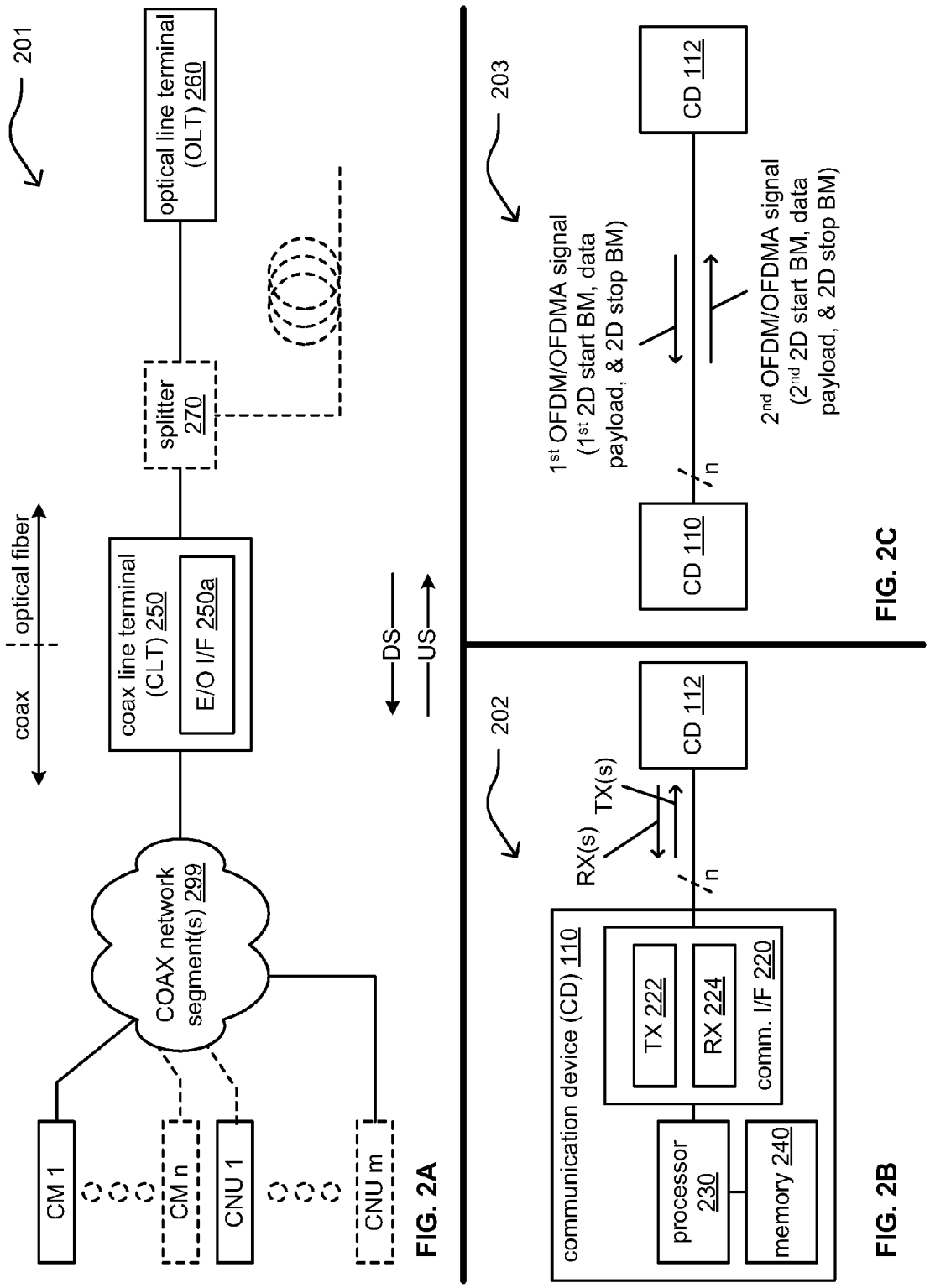

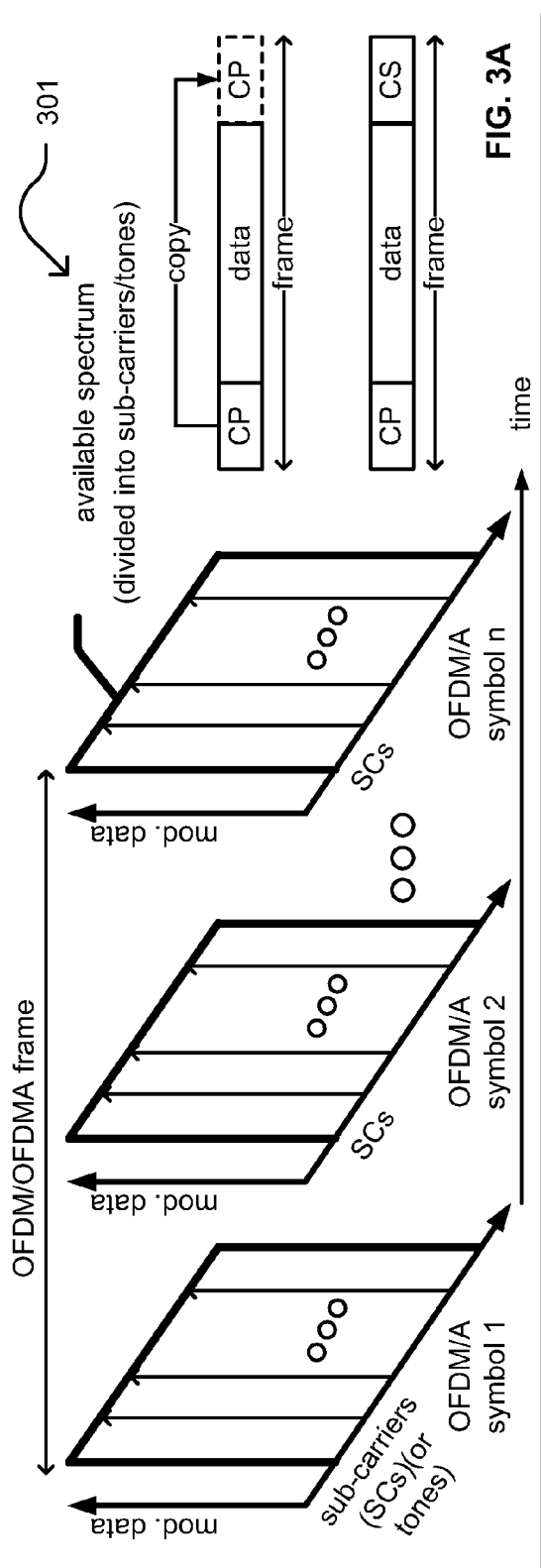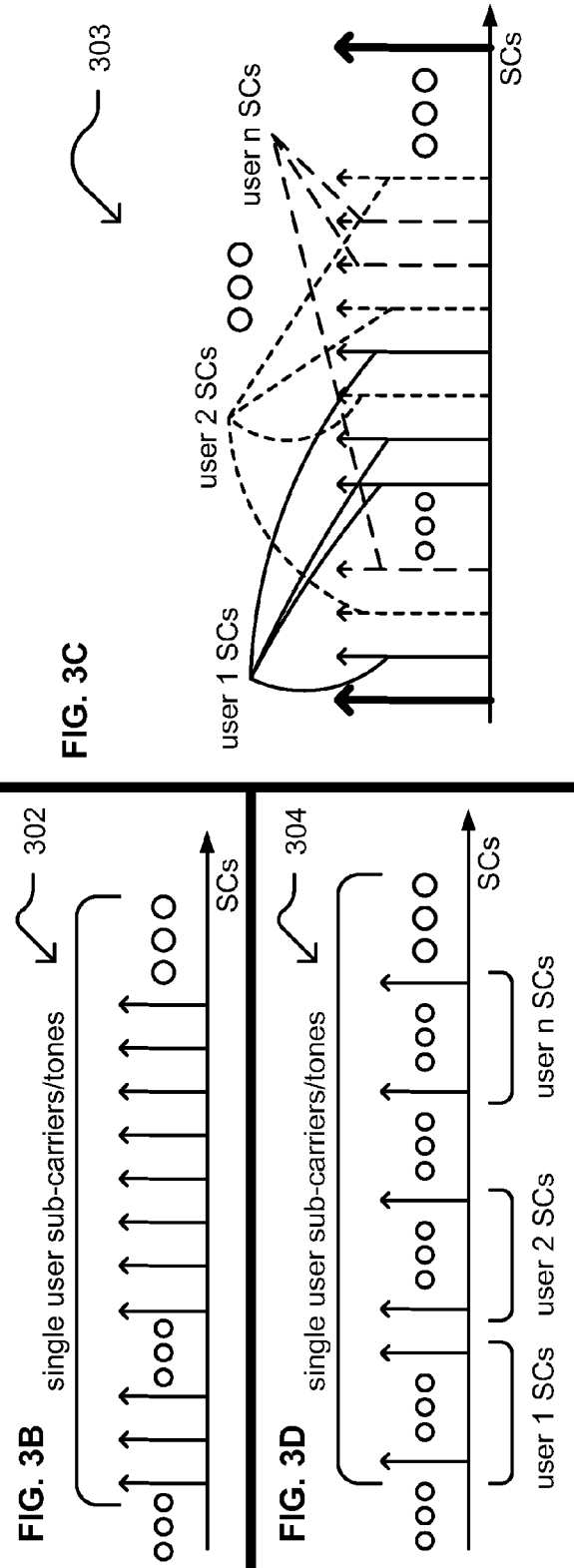
FIG. 3A
FIG. 3B
FIG. 3C
FIG. 3D

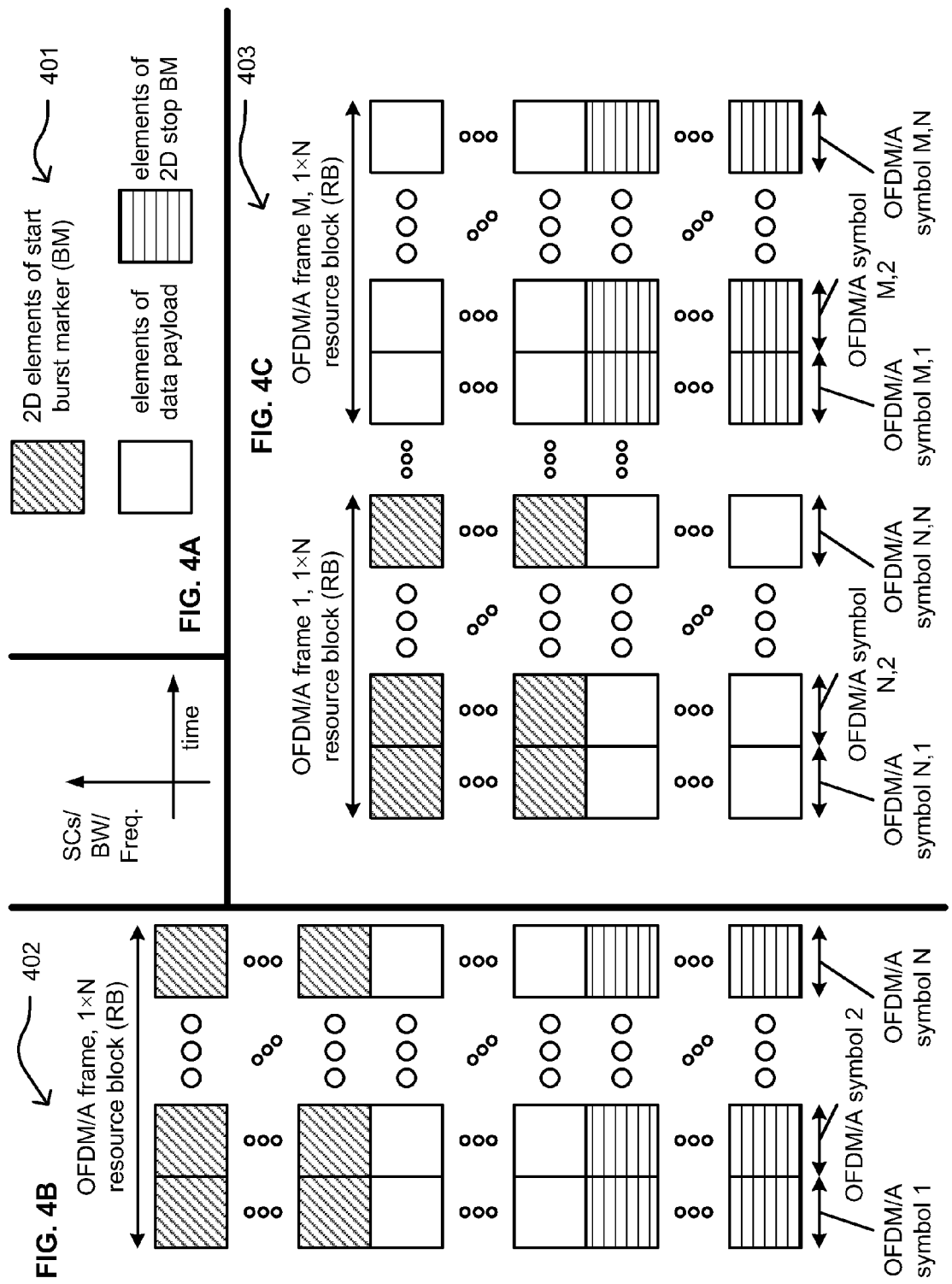

FIG. 7A

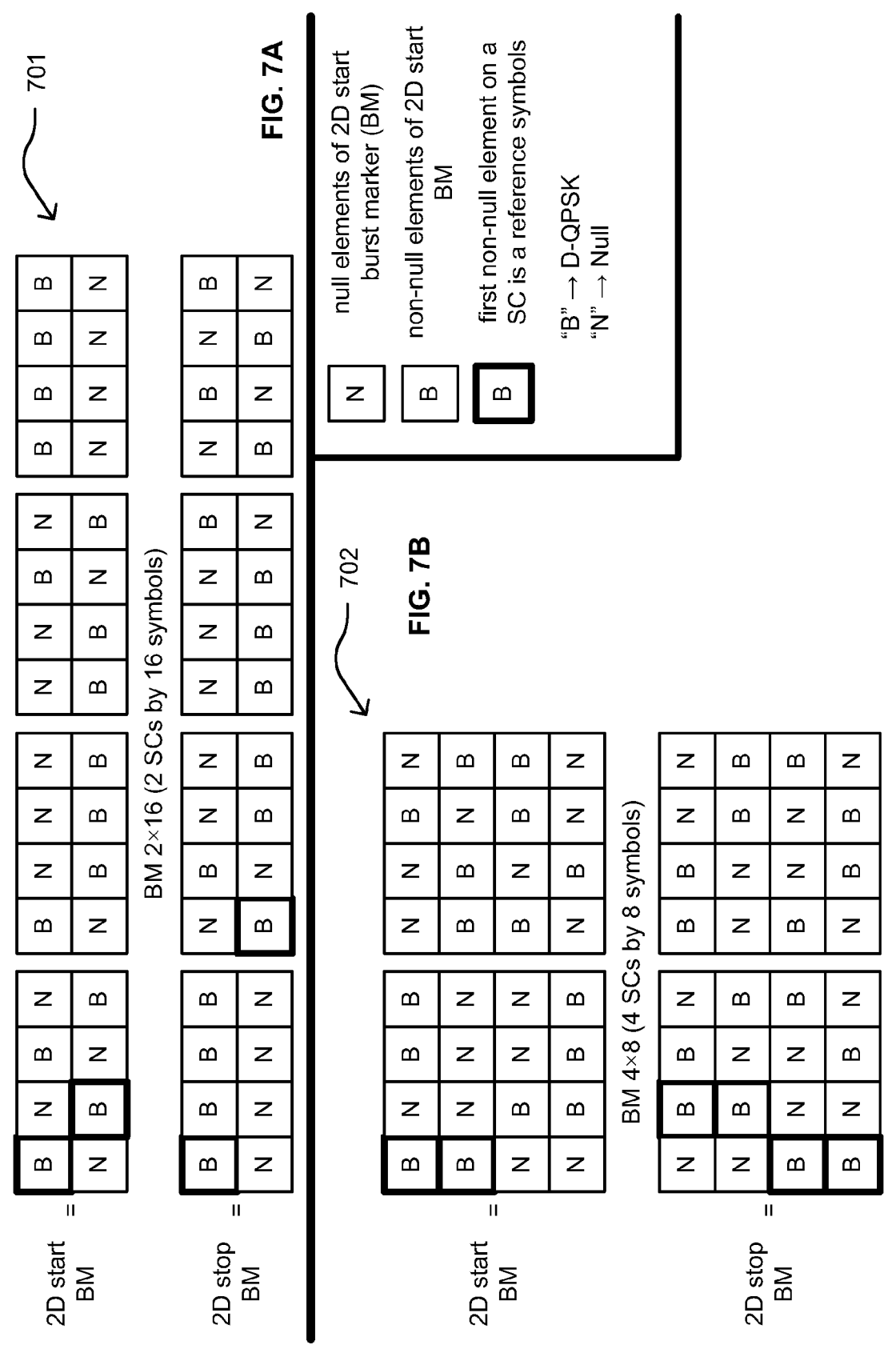

FIG. 7B null elements of 2D start burst marker (BM)

non-null elements of 2D start BM first non-null element on a SC is a reference symbols "B" → D-QPSK
"N" → Null

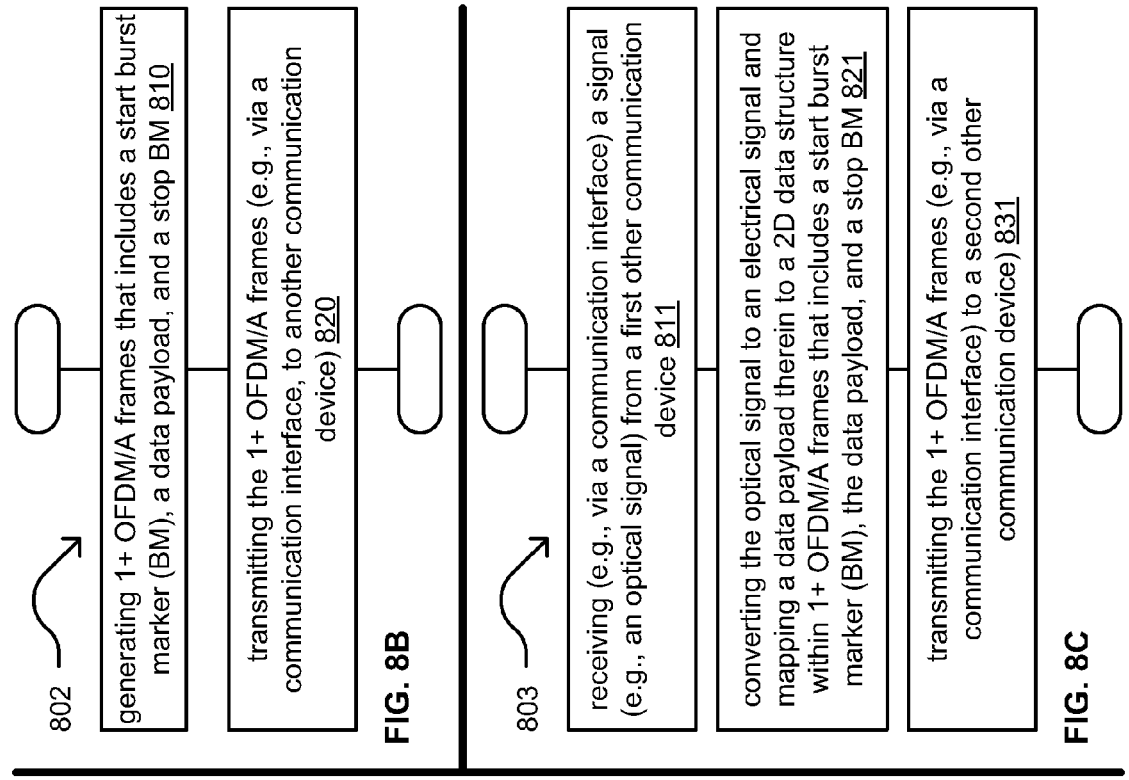

802 — generating 1+ OFDM/A frames that includes a start burst marker (BM), a data payload, and a stop BM 810 transmitting the 1+ OFDM/A frames (e.g., via a communication interface, to another communication device) 820

FIG. 8C

803 — receiving (e.g., via a communication interface) a signal (e.g., an optical signal) from a first other communication device 811 converting the optical signal to an electrical signal and mapping a data payload therein to a 2D data structure within 1+ OFDM/A frames that includes a start burst marker (BM), the data payload, and a stop BM 821 transmitting the 1+ OFDM/A frames (e.g., via a communication interface) to a second other communication device 831

801

| Last RE position in last RB | MSB pointer bits ($I_{2H} I_{2L}$) | Last bit position in last RE | LSB pointer bits ($I_{1H} I_{1L}$) |
|---|---|---|---|
| 0 | 0000 | 0 | 0000 |
| 1 | 0001 | 1 | 0001 |
| 2 | 0010 | 2 | 0010 |
| 3 | 0011 | 3 | 0011 |
| 4 | 0100 | 4 | 0100 |
| 5 | 0101 | 5 | 0101 |
| 6 | 0110 | 6 | 0110 |
| 7 | 0111 | 7 | 0111 |
| 8 | 1000 | 8 | 1000 |
| 9 | 1001 | 9 | 1001 |
| 10 | 1010 | 10 | 1010 |
| 11 | 1011 | 11 | 1011 |
| 12 | 1100 | 12 | 1100 |
| 13 | 1101 | 13 | 1101 |
| 14 | 1110 | 14 | 1110 |
| 15 | 1111 | 15 | 1111 | ns.
TWO-DIMENSIONAL (2D) BURST MARKER (BM) TO IDENTIFY DATA START AND STOP

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional Application No. 61/950,768, entitled "Cable Device that Adds Two Dimensional Upstream Burst Marker to Upstream Data," filed Mar. 10, 2014; and U.S. Provisional Application No. 62/100,428, entitled "Two-dimensional (2D) burst marker (BM) to identify data start and stop," filed Jan. 6, 2015, both of which are hereby incorporated herein by reference in their entirety and made part of the present U.S. Utility patent application for all purposes.

BACKGROUND

Technical Field

The present disclosure relates generally to communication systems; and, more particularly, to indicating start and stop of data transmissions within such communication systems.

Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of adverse effects include interference and noise that may be caused by various sources including other communications, low-quality links, degraded or corrupted interfaces and connectors, etc.

Some communication systems use forward error correction (FEC) coding and/or error correction code (ECC) coding to increase the reliability and the amount of information that may be transmitted between devices. When a signal incurs one or more errors during transmission, a receiver device can employ the FEC or ECC coding to try to correct those one or more errors.

A continual and primary directive in this area of development has been to try continually to lower the signal to noise ratio (SNR) required to achieve a given bit error ratio (BER) or symbol error ratio (SER) within a communication system. The Shannon limit is the theoretical bound for channel capacity for a given modulation and code rate. The ideal goal has been to try to reach Shannon's channel capacity limit in a communication channel. Shannon's limit may be viewed as being the data rate per unit of bandwidth (i.e., spectral efficiency) to be used in a communication channel, having a particular SNR, where transmission through the communication channel with arbitrarily low BER or SER is achievable.

There continues to be room for improvement in various forms of signaling, coding, transmission, etc. of communications between various communication devices within communication systems. In addition, as new technologies continue to be development, the prior art does not present or provide adequate means by which such communications can effectively be performed therein.

BRIEF DESCRIPTION OF THE SEVERAL VIEWS OF THE DRAWINGS

FIG. 2A is a diagram illustrating another embodiment of one or more communication systems.

FIG. 2B is a diagram illustrating an example of a communication device (CD) operative within one or more communication systems.

FIG. 2C is a diagram illustrating another example of a CD operative within one or more communication systems.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 4A is a diagram illustrating an example of a legend for use in interpreting various 2D structure for communications herein.

FIG. 4B is a diagram illustrating an example of a two-dimensional (2D) structure for communications that includes a start burst marker (BM), a data payload, and a stop BM within a single OFDM/A frame.

FIG. 4C is a diagram illustrating an example of a 2D structure for communications that includes a start BM, a data payload, and a stop BM across multiple OFDM/A frames.

FIG. 7A is a diagram illustrating an example of predetermined sequences for a start BM and a stop BM based on 1×16 RB size and 1×16 BM size.

FIG. 7B is a diagram illustrating an example of predetermined sequences for a start BM and a stop BM based on 1×8 RB size and 4×8 BM size.

FIG. 8A is a diagram illustrating an example of BM data for end of data burst pointer within a stop BM.

FIG. 8B is a diagram illustrating an embodiment of a method for execution by one or more communication devices.

FIG. 8C is a diagram illustrating an embodiment of a method for execution by one or more communication devices.

DETAILED DESCRIPTION

Figure 1A:
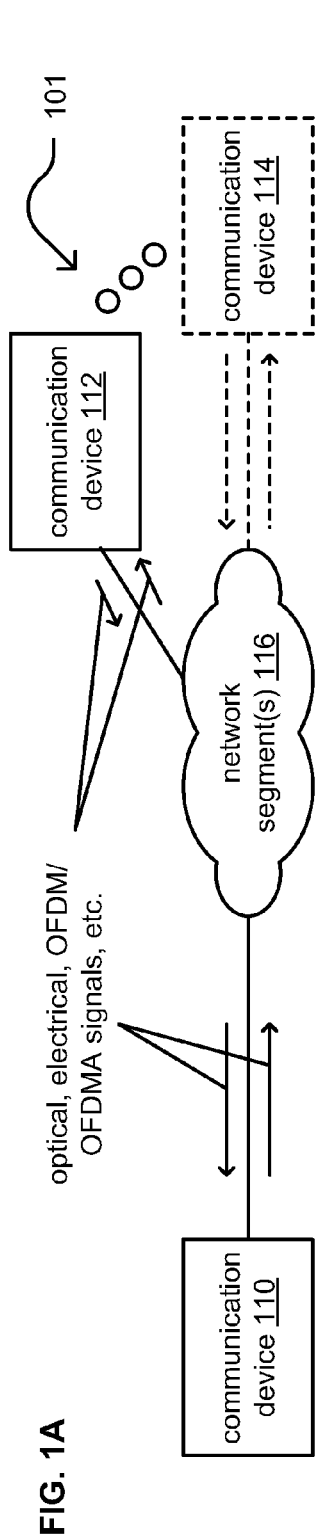
FIG. 1A is a diagram illustrating an embodiment of one or more communication systems.

FIG. 1A is a diagram illustrating an embodiment 101 of one or more communication systems. One or more network segments 116 provide communication inter-connectivity for at least two communication devices 110 and 112 (also referred to as CDs in certain locations in the diagrams). Note that general reference to a communication device may be made generally herein using the term 'device' (e.g., device 110 or CD 110 when referring to communication device 110, or devices 110 and 112, or CDs 110 and 112, when referring to communication devices 110 and 112). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 112-114. This communication may be bidirectional/to and from the one or more of the other devices 112-114 or unidirectional (or primarily unidirectional) from the one or more of the other devices 112-114. The device 110 may be implemented to support communications using a variety of communication medium means including (e.g., electrical, optical, fiber-optic, wireless, wired, and/or any combination thereof). Also, the device 110 may be implemented to support communications using a variety of type of signaling including (e.g., time division multiplexing (TDM) and/or time division multiple access (TDMA) such as in the context of optical and/or fiber-optic signaling, orthogonal frequency division multiplexing (OFDM) signaling, orthogonal frequency division multiple access (OFDMA) signaling, forward error correction (FEC) code and/or error correction code (ECC) based signaling, conversion between electrical and optical and/or fiber-optic systems, and/or any combination thereof).

In an example of operation, one of the devices, such as device 110, includes a communication interface and a processor that cooperatively operate to support communications with another device, such as device 112, among others within the system. The processor is operative to generate and interpret different signals, frames, packets, symbols, etc. for transmission to other devices and that have been received from other devices. The device's communication interface and processor are configured to generate at least one orthogonal frequency division multiplexing (OFDM) frame (e.g., one or more OFDM frames composed of one or more OFDM symbols). Note that general reference to OFDM herein encompasses and includes OFDM, OFDMA, and/or other OFDM-based types of signaling. The device's communication interface and processor are also configured to transmit the at least one OFDM frame to another communication device, such as device 112, among others within the system. In one example, the at least one orthogonal frequency division multiplexing (OFDM) frame that includes a two-dimensional (2D) start burst marker (BM), a data payload, and a 2D stop BM. The 2D start BM includes a first predetermined sequence that is located within a set of adjacent sub-carriers within a first set of adjacent OFDM symbols spanning a first OFDM frame of the at least one OFDM frame, and the 2D stop BM includes a second predetermined sequence that is located within a second set of adjacent sub-carriers within the set of adjacent OFDM symbols spanning the first OFDM frame of the at least one OFDM frame or within another set of adjacent OFDM symbols spanning a second OFDM frame of the at least one OFDM frame (e.g., when the second OFDM frame include two or more OFDM frames). In some examples, the first and second predetermined sequences include known 2D formats (e.g., along a first frequency/bandwidth/channel, etc. axis and also along a second time/symbol/etc. axis). Some examples of first and second predetermined sequences also include both null (e.g., void of data, alternatively, a data null, etc.) and non-null (e.g., actually include data) elements in a 2D format.

Note that the 2D start BM, the data payload, and the 2D stop BM may all be included within the same OFDM frame or distributed among two or more OFDM frames. For example, the 2D start BM may be included within a first OFDM frame that includes a first set of OFDM symbols, and the data payload can begin in that first OFDM frame and be carried over to a second OFDM frame (or second and more other OFDM frames), and the data payload can end in the second OFDM frame (or the last OFDM frame of the second and more other OFDM frames that include the data payload), followed by the 2D stop BM.

In some examples, the device 110 is configured to encode data bits using one or more error correction codes (ECCs) and/or forward error correction (FEC) codes to generate encoded bits to indicate a position of the last bit in a last resource element (RE) of the data payload. These encoded bits are included within the 2D stop BM. In another example, the device 110 is configured to convert between one-dimensional (1D) optical signaling (e.g., 1D as a function of time such as based on TDM and/or TDMA signaling, such that a data payload within such 1D optical signaling is arranged as a 1D sequence of bits) and two-dimensional (2D) electrical signaling (e.g., 2D as a function of both time and frequency such as based on OFDM/A signaling). Generally, the device 110 may be configured to convert between such 1D signaling and 2D signaling within one or both of optical and electrical signaling domains.

When the device 110 generates and transmits one or more OFDM frames to another device, such as device 112, the device 112 receives and processes those one or more OFDM frames and identifies the 2D start BM and the 2D stop BM therein. The device 112 then identifies the start and stop locations of the data payload within the one or more OFDM frames and can then process them accordingly.

Figure 1B:
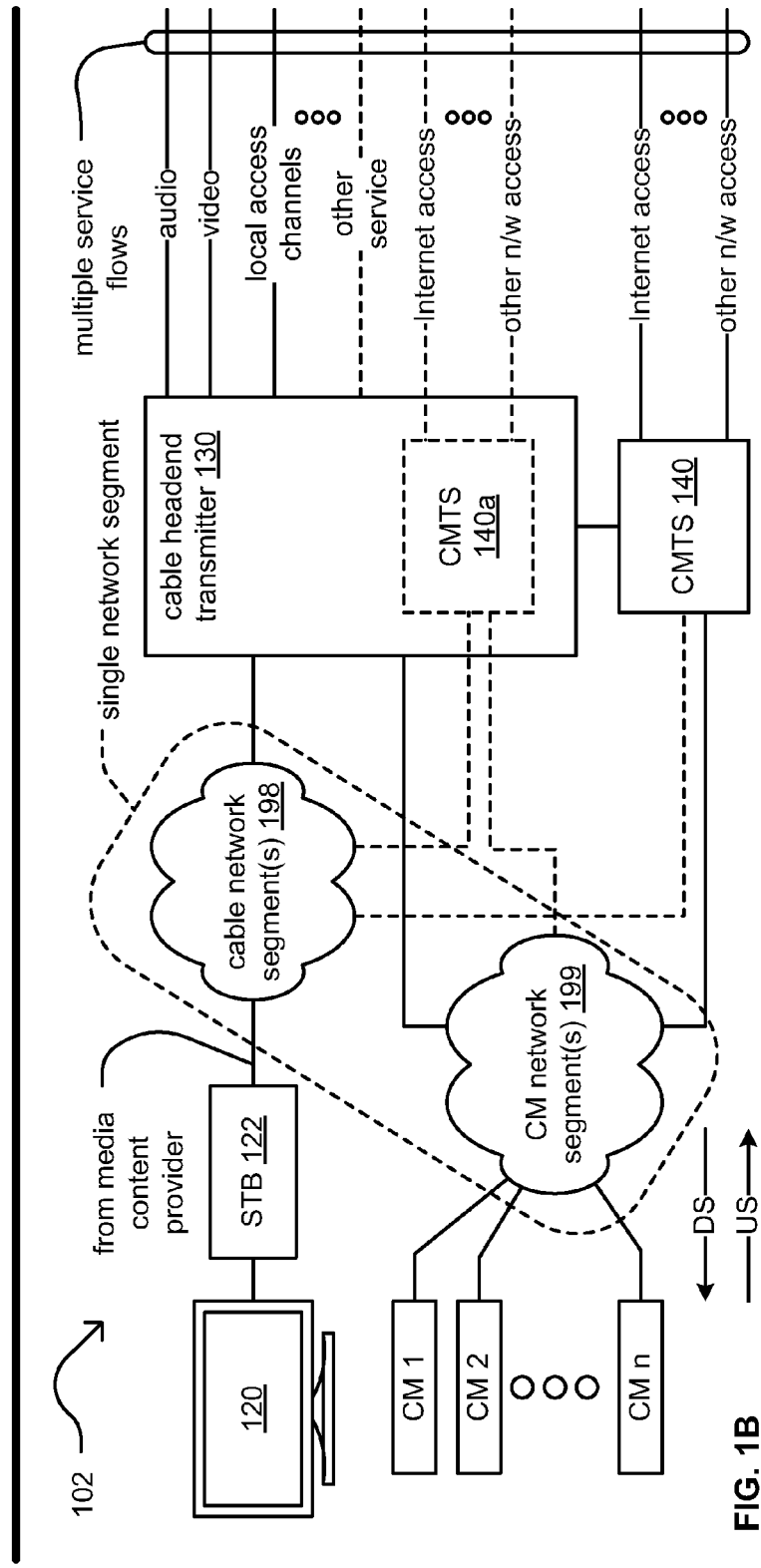
FIG. 1B is a diagram illustrating another embodiment of one or more communication systems.

FIG. 1B is a diagram illustrating another embodiment 102 of one or more communication systems. A cable headend transmitter 130 provides service to a set-top box (STB) 122 via cable network segment(s) 198. The STB 122 provides output to a display capable device 120. The cable headend transmitter 130 can support any of a number of service flows such as audio, video, local access channels, as well as any other service of cable systems. For example, the cable headend transmitter 130 can provide media (e.g., video and/or audio) to the display capable device.

The cable headend transmitter 130 may provide operation of a cable modem termination system (CMTS) 140a. For example, the cable headend transmitter 130 may perform such CMTS functionality, or a CMTS may be implemented separately from the cable headend transmitter 130 (e.g., as shown by reference numeral 140). The CMTS 140 can provide network service (e.g., Internet, other network access, etc.) to any number of cable modems (shown as CM 1, CM 2, and up to CM n) via a cable modem (CM) network segment(s) 199. The cable network segment(s) 198 and the CM network segment(s) 199 may be part of a common network or common networks. The cable modem network segment(s) 199 couples the cable modems 1-*n* to the CMTS (shown as 140 or 140*a*). Such a cable system (e.g., cable network segment(s) 198 and/or CM network segment(s) 199) may generally be referred to as a cable plant and may be implemented, at least in part, as a hybrid fiber-coaxial (HFC) network (e.g., including various wired and/or optical fiber communication segments, light sources, light or photo detection devices, circuits, components, and/or elements, etc.).

A CMTS 140 (or 140*a*) is a component that exchanges digital signals with cable modems 1-*n* on the cable modem network segment(s) 199. Each of the cable modems is coupled to the cable modem network segment(s) 199, and a number of elements may be included within the cable modem network segment(s) 199. For example, routers, splitters, couplers, relays, and amplifiers may be contained within the cable modem network segment(s) 199. Generally speaking, downstream information may be viewed as that which flows from the CMTS 140 to the connected cable modems (e.g., CM 1, CM2, etc.), and upstream information as that which flows from the cable modems to the CMTS 140.

In an example operation, the CMTS 140 generates and transmits one or more OFDM frames to one of the cable modems, CM 1. The one or more OFDM frames include a 2D start BM, a data payload, and a 2D stop BM therein. The 2D start BM and the 2D stop BM indicate the beginning and end of the data payload within the one or more of the frames. The CM 1 receives and processes those one or more OFDM frames and identifies the 2D start BM and the 2D stop BM therein. The CM 1 then identifies the start and stop locations of the data payload within the one or more OFDM frames and processes them accordingly.

FIG. 2A is a diagram illustrating another embodiment 201 of one or more communication systems. This diagram shows a communication system implemented using both coaxial and optical fiber (e.g., optical, and/or fiber-optic, etc.) based technologies. A coax line terminal (CLT) 250 includes circuitry, functionality, capability, etc. (shown as E/O I/F 250*a*) to perform conversion in translation between the electrical and optical domains in both directions (e.g., from the optical domain to the electrical domain and from the electrical domain to the optical domain). In some examples, communications within the optical domain are based on TDM and/or TDMA signaling such that an optical transmitter is either a signal or not and the optical signal is 1D as a function of time. The CLT 250 is in communication via optical communications including with an optical line terminal (OLT) 260. From certain perspectives, the OLT 260 may be viewed as providing traffic downstream ultimately to a number of any number of cable modems (shown as CM 1, CM 2, and up to CM n) and/or any number of coax network units (CNUs) (shown as CNU 1, CNU 2, and up to CNU m) via the OLT 250 and coaxial (COAX) network segment(s) 299. In some implementations, one or more splitters, amplifiers, fiber coax units (FCUs) (e.g., FCU is a communication device that is configured to convert signaling between coaxial and optical based applications), and/or other elements, components, etc. are implemented within the COAX network segment(s) 299 and/or within other network segments in the overall communication system. Similarly, one or more splitters (e.g., splitter 270), amplifiers, and/or other elements, components, etc. are implemented within optical domain serviced between the CLT 250 and the OLT 260. From certain perspectives, this embodiment 201 may be viewed as describing certain aspects of one or both of a EPoC (Ethernet Passive Optical Network Over Coaxial) based communication system and/or a EPON (Ethernet Passive Optical Networks) based communication system. In general, this implementation shows communications between devices covering both the optical and electrical domains (e.g., shown as optical fiber to the right-hand side of the diagram and coaxial (coax) to the left-hand side of the diagram).

The OLT 260 can support any of a number of service flows such as audio, video, local access channels, data, media, Internet, landline telephone, etc. as well as any other service of one or more communication systems. For example, the OLT 260 can provide Internet access to any one or more of the CMs 1-*n* or CNUs 1-*m* via the CLT 250 and the COAX network segment(s) 299.

In an example of operation, the CLT 250 receives an optical signal via an optical communication link that supports time division multiple access (TDMA) communications from the OLT 260. The CLT 250 then converts the optical signal to an electrical signal. This electrical signal includes a data payload arranged as a one-dimensional (1D) sequence of data bits (e.g., 1D as a function of time). The CLT 250 then maps the 1D sequence of data bits of the electrical signal to a 2D data structure to generate at least one OFDM frame that includes a two-dimensional (2D) start BM, a data payload, and a 2D stop BM. The CLT 250 then transmits the at least one OFDM frame to any one or more of the CMs 1-*n* or CNUs 1-*m* via the COAX network segment(s) 299.

In another example operation, the CLT 250 receives an electrical signal from one of the CMs 1-*n* or CNUs 1-*m* via the COAX network segment(s) 299 and converts that electrical signal to an optical signal and transmits the optical signal via the optical communication link to the OLT 260. The electrical signal received by the CLT 250 can include one or more OFDM frames that include a 2D start BM, a data payload, and a 2D stop BM therein. The CLT 250 then performs the reverse mapping of the one or more OFDM frames from a 2D structure to a 1D structure and then generates an optical signal based on that 1D structure for transmission via the optical communication link to the OLT 260.

FIG. 2B is a diagram illustrating an example of a communication device (CD) 110 operative within one or more communication systems. The device 110 includes a communication interface 220 and a processor 230. The communication interface 220 includes functionality of a transmitter 222 and a receiver 224 to support communications with one or more other devices within a communication system. The device 110 may also include memory 240 to store information including one or more signals generated by the device 110 or such information received from other devices (e.g., device 112) via one or more communication channels. Memory 240 may also include and store various operational instructions for use by the processor 230 in regards to the processing of messages and/or other received signals and generation of other messages and/or other signals including those described herein. Memory 240 may also store information including one or more types of encoding, one or more types of symbol mapping, concatenation of various modulation coding schemes, etc. as may be generated by the device 110 or such information received from other devices via one or more communication channels. The communication interface 220 supports communications to and from one or more other devices (e.g., CD 112 and/or other communication devices). Operation of the communication interface 220 may be directed by the processor 230 such that processor 230 transmits and receives signals (TX(s) and RX(s)) via the communication interface 220.

Note that device 110 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

In an example operation, the communication interface 220 and the processor 230 of the CD 110 are configured to generate at least one orthogonal frequency division multiplexing (OFDM) frame and to transmit the at least one OFDM frame to another communication device (e.g., CD 112) via the one or more communication channels. The at least one OFDM frame includes a 2D start burst marker (BM), a data payload, and a 2D stop BM therein.

In one example, the 2D start BM includes a first predetermined sequence that is located within first adjacent sub-carriers within adjacent OFDM symbols of a single OFDM frame, the data payload is located within second adjacent sub-carriers within the adjacent OFDM symbols of the single OFDM frame, and the 2D stop BM includes a second predetermined sequence that is located within third adjacent sub-carriers within the adjacent OFDM symbols of the single OFDM frame. Note that all symbols of at least one of the sub-carriers used to carry the data payload may not be needed, and the 2D stop BM may then be implemented to include information to indicate the last bit and a last resource element (RE) of the respective sub-carrier.

In another example, the 2D start BM includes a first predetermined sequence that is located within first adjacent sub-carriers within first adjacent OFDM symbols of a first OFDM frame, and a first portion of the data payload is located within second adjacent sub-carriers within the first adjacent OFDM symbols of the first OFDM frame. Then, a second portion or a remaining portion of the data payload is carried over to third adjacent sub-carriers within second adjacent OFDM symbols of a second OFDM frame. Depending upon the amount of data within the data payload, the data payload may be carried over to fourth adjacent sub-carriers within third adjacent OFDM symbols of a third OFDM frame. Generally, the 2D start BM, the data payload, and the 2D stop BM may all be included within as few as one OFDM frame or across two or more OFDM frames. In the last OFDM frame that includes the 2D stop BM, the 2D stop BM includes a second predetermined sequence that is located within adjacent sub-carriers within adjacent OFDM symbols thereof.

In some examples, the 2D start BM and the 2D stop BM are respectively entirely located within a single OFDM frame (e.g., both the 2D start BM and the 2D stop BM are located within a single OFDM frame, or the 2D start BM is located within a first OFDM frame and the 2D stop BM is located within a second OFDM frame). In certain examples, while the data payload is allowed to carry over between OFDM frames (e.g., such that a first portion of the data payload is included within a first OFDM frame and a second portion of the data payload is included within a second OFDM frame or more OFDM frames), the entirety of the 2D start BM is constrained to be included within a single OFDM frame. Similarly, in some examples, entirety of the 2D stop BM is constrained to be included within a single OFDM frame. In alternative examples, however, either one or both of the 2D start BM and the 2D stop BM are allowed to be distributed among two or more OFDM frames.

In another example operation, the communication interface 220 and the processor 230 of the CD 110 are configured to receive a transmission that includes at least one orthogonal frequency division multiplexing (OFDM) frame from another communication device, such as CD 112. The communication interface 220 and the processor 230 of the CD 110 are configured to process the at least one OFDM frame to identify a 2D start BM and 2D stop BM therein. Then, the communication interface 220 and the processor 230 of the CD 110 are configured to identify the 2D start BM within the at least one OFDM frame as being a first predetermined sequence that is located within a first plurality of adjacent sub-carriers within a plurality of adjacent OFDM symbols spanning a first OFDM frame of the at least one OFDM frame. Then, the communication interface 220 and the processor 230 of the CD 110 are configured to identify the 2D stop BM within the at least one OFDM frame as being a second predetermined sequence that is located within a second plurality of adjacent sub-carriers within the plurality of adjacent OFDM symbols spanning the first OFDM frame of the at least one OFDM frame or within another plurality of adjacent OFDM symbols spanning a second OFDM frame of the at least one OFDM frame. Then, the communication interface 220 and the processor 230 of the CD 110 are configured to identify a data payload within the at least one OFDM frame as being located between the 2D start BM and the 2D stop BM.

FIG. 2C is a diagram illustrating another example 203 of a CD operative within one or more communication systems. Device 110 supports communications to and from one or more other devices, such as device 112. The CD 110 is configured to perform both generation of OFDM frame(s) that include a 2D start BM, a data payload, and a 2D stop BM for transmission and also reception and detection of OFDM frame(s) that include a 2D start BM, a data payload, and a 2D stop BM. Generally speaking, CD 110 receives a first OFDM/OFDMA signal from CD 112 that includes a first 2D start BM, a first data payload, and a first 2D stop BM. The CD 110 also generates and transmits a second OFDM/OFDMA signal to CD 112 that includes a second 2D start BM, a second data payload, and a second 2D stop BM. Note that the CD 110 and 112 may be implemented within any types of communication systems including those that operate using coaxial-based communication means as well as optical and/or fiber-optic-based communication means.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right-hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

Generally, a communication device may be configured to include a processor and the communication interface configured to process received OFDM or OFDMA symbols and/or frames and to generate such OFDM or OFDMA symbols and/or frames. The processor and the communication interface of the communication device are configured to support such communications with and between other communication devices including generating, transmitting, receiving, and processing OFDM/A frames that include 2D start BMs, data payloads, and 2D stop BMs therein.

FIG. 4A is a diagram illustrating an example 401 of a legend for use in interpreting various 2D structure for communications herein. In certain of these diagrams, the elements of the data payload (e.g., where an element is a portion of an OFDM/A symbol within one or more sub-carriers) are shown as an empty square, while the elements of the start BM and the stop BM are shown as hashed angularly or horizontally, respectively. Note that certain examples. Refer to the start and stop BMs as 2D start and stop BMs; note that the 2D start and stop BMs may alternatively be referred to as to as start and stop BMs as well (including in some of the diagrams), respectively, for brevity.

FIG. 4B is a diagram illustrating an example 402 of a two-dimensional (2D) structure for communications that includes a start burst marker (BM), a data payload, and a stop BM within a single OFDM/A frame.

This example 402 shows the an OFDM/A frame that includes N symbols, where N is a positive integer greater than or equal to 1, and a resource block (RB) that that has a 1×N size. The 2D start BM is shown as including a number of 1×N size RBs across a number of adjacent sub-carriers. In this example 402, the 2D start BM is shown as being located at the top of an OFDM/A frame; however, note that the 2D start BM may alternatively be located at a different position (e.g., not adjacent to the top) within the OFDM/A frame in other examples.

The data payload begins adjacent to and below the 2D start BM. The data payload is shown as including as including a number of 1×N size RBs across a number of adjacent sub-carriers. Note that all of the positions in the last sub-carrier of the 1×N size RB of the data payload may not necessarily be full of data, such as if the data payload does not include an integral number of N bits.

The 2D stop BM begins adjacent to them below the data payload and is shown as including a number of 1×N size RBs across a number of adjacent sub-carriers. In this example 402, the 2D start BM is shown as being located at the bottom of an OFDM/A frame; however, note that the 2D stop BM may alternatively be located at a different position (e.g., not adjacent to the bottom) within the OFDM/A frame in other examples.

In some examples, the total 2D size of the 2D start and stop BMs is the same (e.g., they both are located within a respective number of sub-carriers and a same respective number of 1×N size RBs, such as the size of the 2D start and stop BMs both being X×N size, being located in X sub-carriers (where X is an integer greater than or equal to 1) and based on a 1×N size RB). Note that the size of the data payload can be any desired size including as few as one 1×N size RB or two or more 1×N size RBs.

FIG. 4C is a diagram illustrating an example 403 of a 2D structure for communications that includes a start BM, a data payload, and a stop BM across multiple OFDM/A frames. This example 402 shows a 2D structure that spans M OFDM/A frames. The 2D start BM is shown as including a number of 1×N size RBs across a number of adjacent sub-carriers within a first OFDM/A frame.

The data payload begins adjacent to and below the 2D start BM. The data payload is shown as including as including a number of 1×N size RBs across a number of adjacent sub-carriers and filling the remainder of the first OFDM/A frame. In this example 402, the 2D start BM is shown as being located at the top of an OFDM/A frame; however, note that the 2D start BM may alternatively be located at a different position (e.g., not adjacent to the top) within the OFDM/A frame in other examples. Because of the size of the data payload and this example 403, the data payload fills at least a portion of one other OFDM/A frame. In some examples, when the size of the data payload is relatively large, the data payload fills one or more other OFDM/A frames completely and at least a portion of one other OFDM/A frame. Note that all of the positions in the last sub-carrier of the 1×N size RB of the data payload in the last OFDM/A frame required to carry the data payload may not necessarily be full of data, such as if the data payload does not include an integral number of N bits.

In the last OFDM/A frame of this 2D structure that spans M OFDM/A frames, the 2D stop BM begins adjacent to them below the data payload and is shown as including a number of 1×N size RBs across a number of adjacent sub-carriers. In this example 402, the 2D start BM is shown as being located at the bottom of an OFDM/A frame; however, note that the 2D stop BM may alternatively be located at a different position (e.g., not adjacent to the bottom) within the OFDM/A frame in other examples.

Generally, a burst marker (BM) indicates the start and stop of a communication burst (e.g., an upstream burst). Note that the use of BMs may be used for communications generally in any direction of a communication system (e.g., upstream (US), downstream (DS), uplink (UL), downlink (DL), etc.). In one example, the BM is a sequence for transmission (e.g., upstream transmission) provide from a first communication device (e.g., a transmitter communication device) in order to provide an indication to the communication regarding an associated upstream burst transmission to a second communication device (e.g., a receiver communication device). A two-dimensional (2D) BM may be implemented in the physical layer (PHY) layer by a processor and/or communication interface of a communication device.

In EPoC (Ethernet Passive Optical Network Over Coaxial), the arrival time and length of a burst in unknown to other communication devices at the physical layer (PHY) layer. The PHY layer of a receiver communication device then is configured to detect the BM start and stop time (e.g., based on the 2D start and stop BMs) to figure out how to demodulate and decode (e.g., using error correction code (ECC) and/or forward error correction (FEC)) the incoming burst.

The BMs presented herein has a 2D structure (e.g., 1D as a function of sub-carrier/frequency/bandwidth×another 1D as a function of time/symbol, such as—carrier/frequency/bandwidth along a first dimension and time/symbol along a second dimension) such as based on orthogonal frequency division multiplexing (OFDM) and/or orthogonal frequency division multiple access (OFDMA) as described herein.

The BM presented herein (e.g., which combines Nulls, e.g., described by "N" in some examples and Non-Nulls binary phase shift keying (BPSK) sequence, e.g., described by "B" in some examples) are unlike only QAM modulation on the OFDM sub-carriers. This property and the 2D structure make it higher performance (lower error rate for mis-detection and false-detection) than a prior art/conventional one-dimension sequence mapped into the 2D OFDM.

In one example, the ratio of number of nulls ("N") to the number of BPSK non-nulls ("B") is 1:1 (e.g., the number of nulls ("N") is same as the number of non-nulls ("B")). These may be referred to as the "N" sequence and the "B" sequence within the predetermined sequence of the 2D start and stop BMs, respectively. This can allow for the boosting of the sequence by 3 dB while keeping the power to unity when transmitting the BM. The first and second predetermined sequences for use as the 2D start and stop BMs allows a receiver communication device to detect the 2D start and stop BMs accurately and identify data payload within a transmission accurately and effectively. A receiver communication device that identified such 2D start and stop BMs based on a priori knowledge of format and structure of such predetermined sequences.

In some examples, the "B" sequence is boosted by 3 dB. The base sequence is profile 0. The base sequence is chosen such that circular shift of the base sequence are orthogonal to each other. This allows multiple profile (or message) can be signaled between the burst TX and burst RX at the PHY layer.

The 2D stop BM may be viewed as being the complement of the 2D start BM. This greatly simplifies the design of the detector within a communication device (e.g., at the PHY layer, such as with respect to FIG. 10A and FIG. 10B).

The 2D start and stop BMs fit in the 2-D OFDM/A framing data structure, but they distinguishable from the data payload. The 2-D burst marker structure can be based on a grid that includes resource blocks (RBs) defined in time (symbol) and frequency (e.g., time (symbol) along a first dimension and frequency along a second dimension).

The novel design of 2D start and stop BMs presented herein provide for the 2D start and stop BMs to be separately from the data payload (e.g., no intermixing of the data payload within the BMs). In some examples, each BM has a data field such that the stop BM data indicates the last payload resource element (RE) in the last resource block (RB) and the last bit location in the last RE. The start BM data can be used for various other desired purposes.

Data is sent in differential quadrature phase shift keying (QPSK) (D-QPSK) modulation with 3 dB boosting. The first data symbol of a RB (e.g., in the time/symbol direction or axis of the 1D structure) may be referred to as a reference symbol (e.g., with (00)→0° phase shift, (01)→+90° phase shift; and with (11)→180° phase shift, (10)→−90° phase shift).

A receiver communication device may be implemented to perform demodulation without channel estimation. A receiver communication device may be implemented to perform demodulation without pre-equalization or with imperfect pre-equalization. This allows a receiver communication device to perform BM detection and demodulation with frequency exclusions in a BM or a BM spanning two or more OFDM/A frames.

Figure 5:
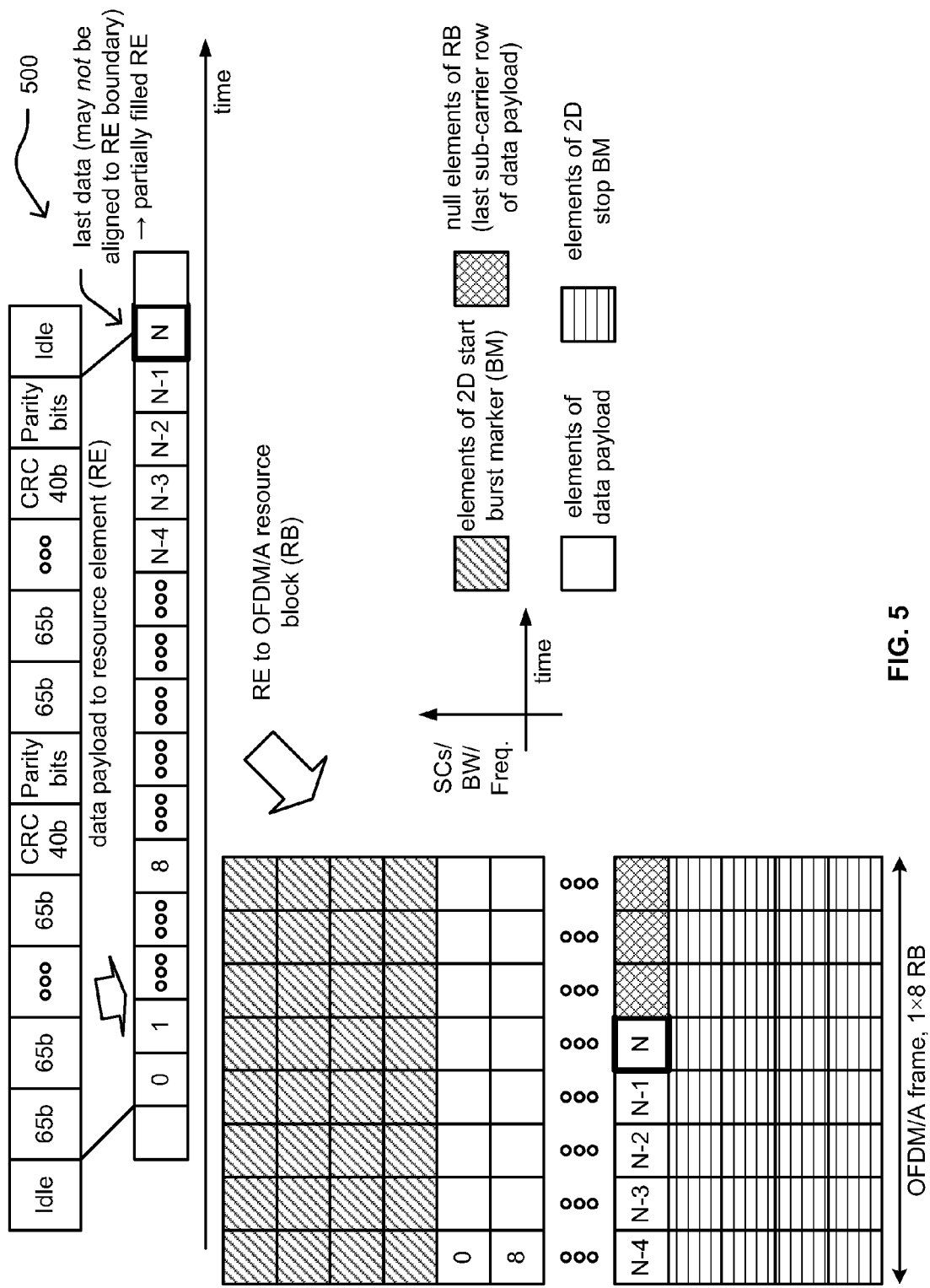
FIG. 5 is a diagram illustrating an example of a 2D structure for communications based on 1×8 resource block (RB) size and 4×8 BM size.

FIG. 5 is a diagram illustrating an example 500 of a 2D structure for communications based on 1×8 resource block (RB) size and 4×8 BM size. This diagram shows the packing of data into 1×8 RB example 2D stop BM that marks the last bit in the last Resource element (RE) with data. At the top of the diagram, the data payload is shown in multiple of 65 bits+multiple cyclic redundancy check (CRC) and parity bits. This data payload may be viewed as being associated with an optical signal received within a communication system that operates based on TDM and/or TDMA. The data payload is then arranged on a RE basis such that a first bit is aligned to a RB boundary and a last bit may not be aligned to a RE boundary resulting in a partially filled RE. Then, the RE-based data payload, being one-dimensional (1D), is then arranged to OFDM/A 2D respectfully RBs. This process may be described as follows:

1. Insert Data into RE. Align first data bit with first RE bit.
2. Fill REs with Data. Note that this filling may end up with a partially filled RB with a partially filled last RE.
3. Pack REs in RBs of OFDMA frame. Align first data RE with beginning of RB.
4. Add Start Burst Marker to indicate position of first RB with data.
5. Add Stop Burst Marker with FEC encoded (8 bit) pointer to indicate position of last bit (4 bits) in last RE (4 bits) with data.
6. Burst receiver determines the size of data burst between Burst Markers by decoding FEC encoded pointer in Stop Burst Marker.

In this example, note that the first 4 pointer bits define the position of the last data RE in the last RB (0 through K−1 for an RB of 1 sub-carrier by M RE. The last 4 pointer bits define the position of the last data bit in the last RE (0 through M−1 for an RB of M bits. (K and M≤16).

The ordering by which the data payload from the signal on the top of the diagram is packed into the 2D structure at the left hand side of the diagram is shown by the locations marked by 0, . . . , 8, . . . , N−4, N−3, N−2, N−1, N. In one example, the data payload is filled into the sub-carriers just below the 2D start BM in an order based on left to right, top to bottom and fills as many RBs as needed (e.g., within one OFDM/A frame or two or more OFDM/A frames) until the data payload is filled. When only one OFDM/A frame is needed/used, the 2D start BM, the data payload, and the 2D stop BM are all included within that one OFDM/A frame. When two or more OFDM/A frames are needed/used, the data payload is filled into the sub-carriers just below the 2D start BM from left to right, top to bottom within a first OFDM/A frame that includes the 2D start BM, then begins at the top of a second OFDM/A frame (and may end up filling the entirety of that second OFDM/A frame). Then, in a last/final OFDM/A frame (e.g., which may be the second OFDM/A frame, a third OFDM/A frame, or more) that is needed to include the data payload, then the last/final OFDM/A frame includes the remainder of the data payload (e.g., based on from the top sub-carrier and filling the sub-carriers in an ordering from left to right, top to bottom) and is followed by the 2D stop BM (e.g., the 2D stop BM starts in a new RB just below a last RB that includes at least a portion of the data payload). Again, note that all elements of the last RB may not be filled completely. Note also that while such filling of sub-carriers within one or more OFDM/A symbols within one or more OFDM/A frames is described in this example as being performed from left to right, top to bottom, it may alternatively be performed from left to right, bottom to bottom; left to right, top to bottom; bottom to top, left to right; bottom to top, right to left; and/or any other variation, etc. in other examples.

Figure 6:
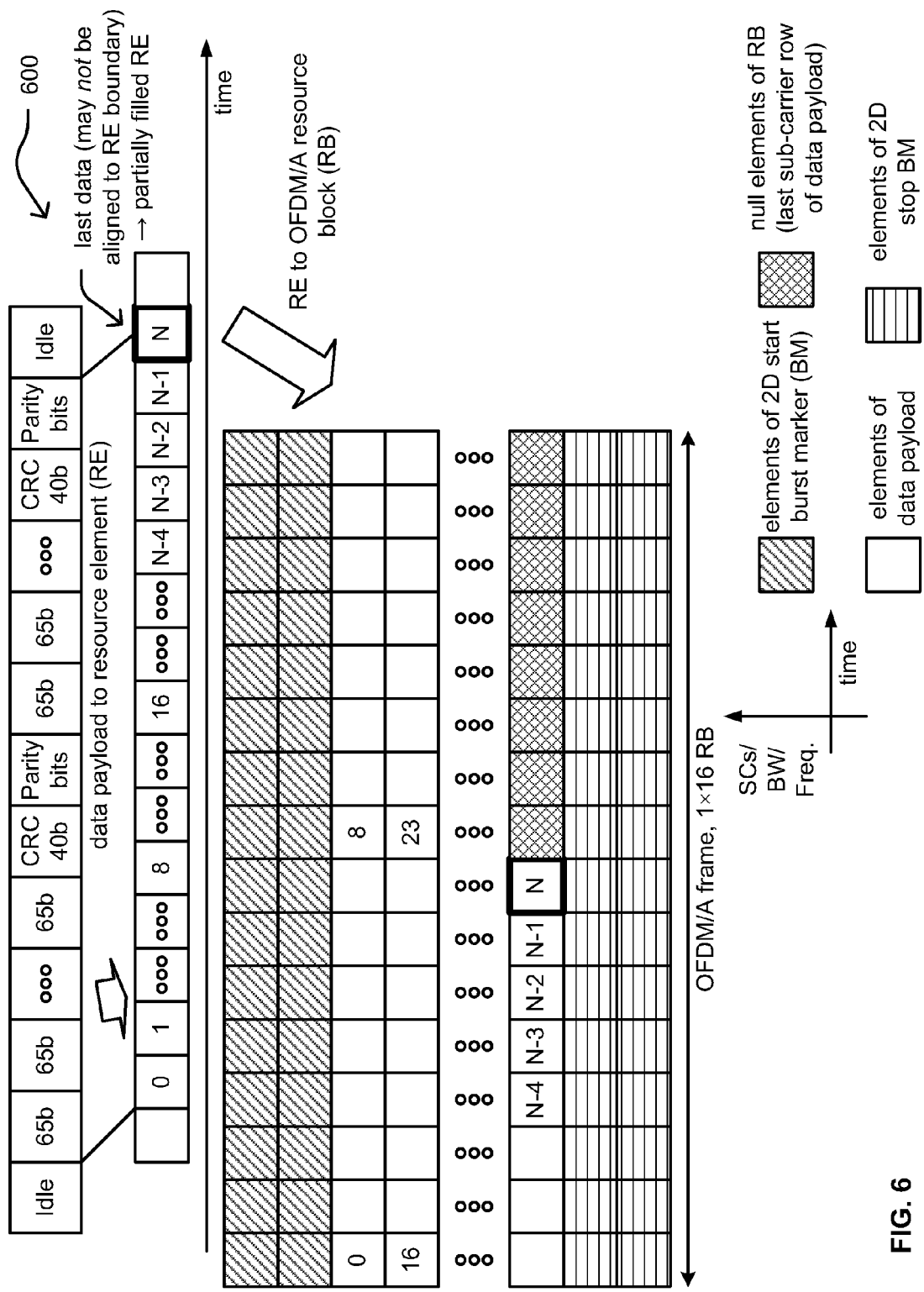
FIG. 6 is a diagram illustrating an example of a 2D structure for communications based on 1×16 resource block (RB) size and 2×16 BM size.

FIG. 6 is a diagram illustrating an example 600 of a 2D structure for communications based on 1×16 resource block (RB) size and 2×16 BM size. This example 600 is similar to the example 500 of FIG. 5 except uses a 2×16 BM size. The process is similar but uses differently sized RBs, REs, OFDM/A frames, etc.

In this diagram, the ordering by which the data payload from the signal on the top of the diagram is packed into the 2D structure at the left hand side of the diagram is shown by the locations marked by 0, . . . , 8, . . . , 16, . . . , 23, . . . , N, N−4, N−3, N−2, N−1, N.

FIG. 7A is a diagram illustrating an example 701 of predetermined sequences for a start BM and a stop BM based on 1×16 RB size and 1×16 BM size. This diagram shows a first predetermined sequence (2D start BM) that includes a first set of 32 elements arranged across a set of 2 adjacent sub-carriers and 16 adjacent OFDM symbols and a second predetermined sequence (2D stop BM) that includes a second set of 32 elements arranged across the same set of 2 adjacent sub-carriers and the same 16 adjacent OFDM symbols. In some examples in which data is modulated in the locations shown as "B" (e.g., non-null) Note that the data FIG. 7B is a diagram illustrating an example 702 of predetermined sequences for a start BM and a stop BM based on 1×8 RB size and 4×8 BM size. This diagram shows a first predetermined sequence (2D start BM) that includes a first set of 32 elements arranged across a set of 4 adjacent sub-carriers and 8 adjacent OFDM symbols and a second predetermined sequence (2D stop BM) that includes a second set of 32 elements arranged across the same set of 4 adjacent sub-carriers and the same 8 adjacent OFDM symbols.

This disclosure presents adding a quadrature phase shift keying (QPSK) signal on the "B" sequence for use to signal to location of the last bit of payload. The QPSK signal is used to identify the resource element position and the last bit of payload in the OFDMA burst. The QPSK signal can be implemented using an error correction code to improve performance in presence of burst noise and white noise (e.g., additive white Gaussian noise (AWGN)).

In this disclosure, the two-dimensional (2D) burst marker (BM) is immune to false trigger from burst noise in a cable plant (e.g., because the burst noise typically corrupt one or two OFDMA symbols (a column in the 2D burst marker). The BM detector looks for a power ratio between the "B" and "N". This ratio is not affected by burst noise because there is an equal number of "N" and "B" per column. Examples of circuitries, functional blocks, diagrams, and/or architecture, etc. are also shown with respect to FIG. 10A and FIG. 10B for different sizes of 2D start and stop BMs.

For the end of the burst payload, the 2D stop BM provides a solution that provides 1) an indication of where the payload ends, the resource element and the bit location within a resource element, and 2) a modified burst marker format that did not intermix burst data within or after the end burst marker. The 2D start and stop BMs as presented herein do not false trigger from burst noise in the cable plant. Also, the BM with data pointer indicates which last bit and which resource element (RE) within a last resource block (RB) in which the data payload ends. Also, in some examples, the BM pointer data undergoes error correction code (ECC) and/or forward error correction (FEC) encoded for protection against burst errors (e.g., such as using a Reed-Solomon (RS) code).

With respect to these specific examples of predetermined sequences for start BMs and stop BMs above with reference to FIG. 7A and FIG. 7B, different types of resource blocks (RBs) are used.

FIG. 7A RB=1 sub-carrier×16 symbols such that a BM uses two RBs.

FIG. 7B RB=1 sub-carrier×8 symbols such that a BM uses four RB.

D-QPSK data is modulated on those elements marked by "B" and Nulls (e.g., void of any data) on "N" within the BM pattern. These 2D sequences have good auto-correlation and cross-correlation properties. Also, the 2D start and stop BMs have low cross-correlation property. Note that the dark outlined elements in the predetermined sequences of FIG. 7A and FIG. 7B (e.g., first "B" on a sub-carrier) corresponds to a reference symbol. Again, "B"→D-QPSK, and "N"→Null.

Some specific examples are provided below for the reader.

Example of Data in a 2D stop BM of size 2×16 (e.g., 2 sub-carriers by 16 symbols):

BM=[(+1+1) (+1+1) (−1−1) (+1−1) N (+1+1) N N N N N (+1−1) N (−1+1) N (−1+1)
N N N N (+1+1) N (−1+1) (−1−1) (−1−1) (−1+1) (+1−1) N (+1+1) N (+1+1) N];

Data=[* (00) (11) (01) * (01) * * * * * (10) * (11) * (00) * * * * * * (01) (01) (00) (10) (11) * (01) * (00) *];

The first QPSK (+1+1) on a sub-carrier is a reference symbol.

Example of Data in a 2D stop BM of size 4×8 (e.g., 4 sub-carriers by 8 symbols):

BM=[N (+1+1) (−1+1) N (+1+1) (−1−1) N N N (+1+1) N (+1+1) N N (−1−1) (+1−1) (+1+1) N N (−1−1) (+1+1) N N (−1+1) (+1+1) N (−1+1) N N (−1−1) (+1−1) N];

Data=[* * (01) * (10) (11) * * * * * (00) * * (11) (01) * * * (10) (01) * * (11) * * (01) * * (01) (01)*];

| Phase Shift | 0° | +90° | 180° | −90° |
|---|---|---|---|---|
| Data | 00 | 01 | 11 | 10 |

With respect to the encoding of data (e.g., including data one or both of the 2D start and stop BMs), a Reed-Solomon (RS) code over a Galois Field, $GF(2^4)$, with $t=2$, may be used on one example that employs 4 bits per code symbol, 4 parity symbols per codeword, and with error correcting capability of to correct two symbol errors in a codeword. The RS code generator polynomial is as follows:

$g(x)=(x+\alpha^0)(x+\alpha^1)(x+\alpha^2)(x+\alpha^3)$, where the primitive element alpha is 0×2.

The RS primitive polynomial is as follows: $p(x)=x^4+x+1$.

The Reed-Solomon(15,11) code can be shortened to length 6 or 7 (e.g., with 8 or 12 information bits per shortened codeword).

An example of RS FEC for 2×16 BM is provided below. A RS symbol uses two QPSK data resource elements (REs). It uses a QPSK information data pair of 2 MSBs $I_{jH}$ and 2 LSBs $I_{jL}$, j=1, 2, 3. It also uses a QPSK parity pair of 2 MSBs $P_{kH}$ and 2 LSBs $P_{kL}$, k=1, 2, 3, 4. A RS(15,11) 2 error-correcting code shortened to length 7 is used. This corrects burst error over two consecutive OFDM/A symbols. This uses 12 information bits per shortened codeword.

As example of such a 2D stop BM is as follows:

| $I_{ref}$ | $I_{3H}$ | $I_{3L}$ | $I_{2H}$ | 0 | $I_{2L}$ | 0 | 0 | 0 | 0 | 0 | $P_{3L}$ | 0 | $P_{2L}$ | 0 | $P_{1L}$ |
| 0 | 0 | 0 | 0 | $I_{ref}$ | 0 | $I_{1H}$ | $I_{1L}$ | $P_{4H}$ | $P_{4L}$ | $P_{3H}$ | 0 | $P2_H$ | 0 | $P_{1H}$ | 0 |

An example of RS FEC for 4×8 BM is provided below. A RS symbol uses two QPSK data REs. It uses QPSK info data pair of 2 MSBs $I_{jH}$ and 2 LSBs $I_{jL}$, j=1, 2, 3. It also uses a QPSK parity pair of 2 MSBs $P_{kH}$ and 2 LSBs $P_{kL}$, k=1, 2, 3, 4. A RS(15,11) 2 error-correcting code shortened to length 6 is used. This corrects burst error over two consecutive OFDMA symbols. This uses 8 information bits per shortened codeword.

As example of such a 2D stop BM is as follows:

| 0 | $I_{ref}$ | $I_{2H}$ | 0 | $P_{4H}$ | $P_{3H}$ | 0 | 0 |
| 0 | $I_{ref}$ | 0 | $I_{1H}$ | 0 | 0 | $P_{2H}$ | $P_{1H}$ |
| $I_{ref}$ | 0 | 0 | $I_{1L}$ | $P_{4L}$ | 0 | 0 | $P_{1L}$ |
| $I_{ref}$ | 0 | $I_{2L}$ | 0 | 0 | $P_{3L}$ | $P_{2L}$ | 0 |

FIG. 8A is a diagram illustrating an example 801 of BM data for end of data burst pointer within a stop BM. As described herein, a device may be configured to encode data bits using one or more ECCs and/or FEC codes (e.g., Reed-Solomon (RS) code) to generate encoded bits to indicate a position of the last bit in a last resource element (RE) of the data payload. These encoded bits are included within the 2D stop BM. This table shows pointer bits that can be used to specify the last RE position and the last bit position in the last RE as described in this table.

FIG. 8B is a diagram illustrating an embodiment of a method 802 for execution by one or more communication devices. The method 802 begins by generating at least one orthogonal frequency division multiplexing (OFDM) frame that includes a two-dimensional (2D) start burst marker (BM), a data payload, and a 2D stop BM (block 810). In some examples, the 2D start BM includes a first predetermined sequence that is located within a first plurality of adjacent sub-carriers within a plurality of adjacent OFDM symbols spanning a first OFDM frame of the at least one OFDM frame, and the 2D stop BM includes a second predetermined sequence that is located within a second plurality of adjacent sub-carriers within the plurality of adjacent OFDM symbols spanning the first OFDM frame of the at least one OFDM frame or within another plurality of adjacent OFDM symbols spanning a second OFDM frame of the at least one OFDM frame. The method 802 continues by transmitting, via a communication interface of the communication device, the at least one OFDM frame to another communication device (block 820).

FIG. 8C is a diagram illustrating an embodiment of a method 803 for execution by one or more communication devices. The method 803 begins by receiving (e.g., via a communication interface) a signal (e.g., an optical signal) from a first other communication device (block 811).

With respect to the operation(s) of the block 811, the method 803 operates by processing at least one OFDM frame associated with the signal (e.g., the optical signal) to identify a two-dimensional (2D) start burst marker (BM) and 2D stop BM therein. The method 803 then operates by identifying the 2D start BM within the at least one OFDM frame as being a first predetermined sequence that is located within first adjacent sub-carriers within adjacent OFDM symbols spanning a first OFDM frame. The method 803 then operates by identifying the 2D stop BM within the at least one OFDM frame as being a second predetermined sequence that is located within second adjacent sub-carriers within the adjacent OFDM symbols spanning the first OFDM frame or within other adjacent OFDM symbols spanning a second OFDM frame. The method 803 then operates by identifying a data payload within the at least one OFDM frame as being located between the 2D start BM and the 2D stop BM.

Then, the method 803 continues by converting the optical signal to an electrical signal and mapping a data payload therein to a 2D data structure within one or more OFDM/A frames that includes a start burst marker (BM), the data payload, and a stop BM (block 821). The method 803 then operates by transmitting the one or more OFDM/A frames (e.g., via a communication interface) to a second other communication device) (block 831).

Figures 9A, 9B:
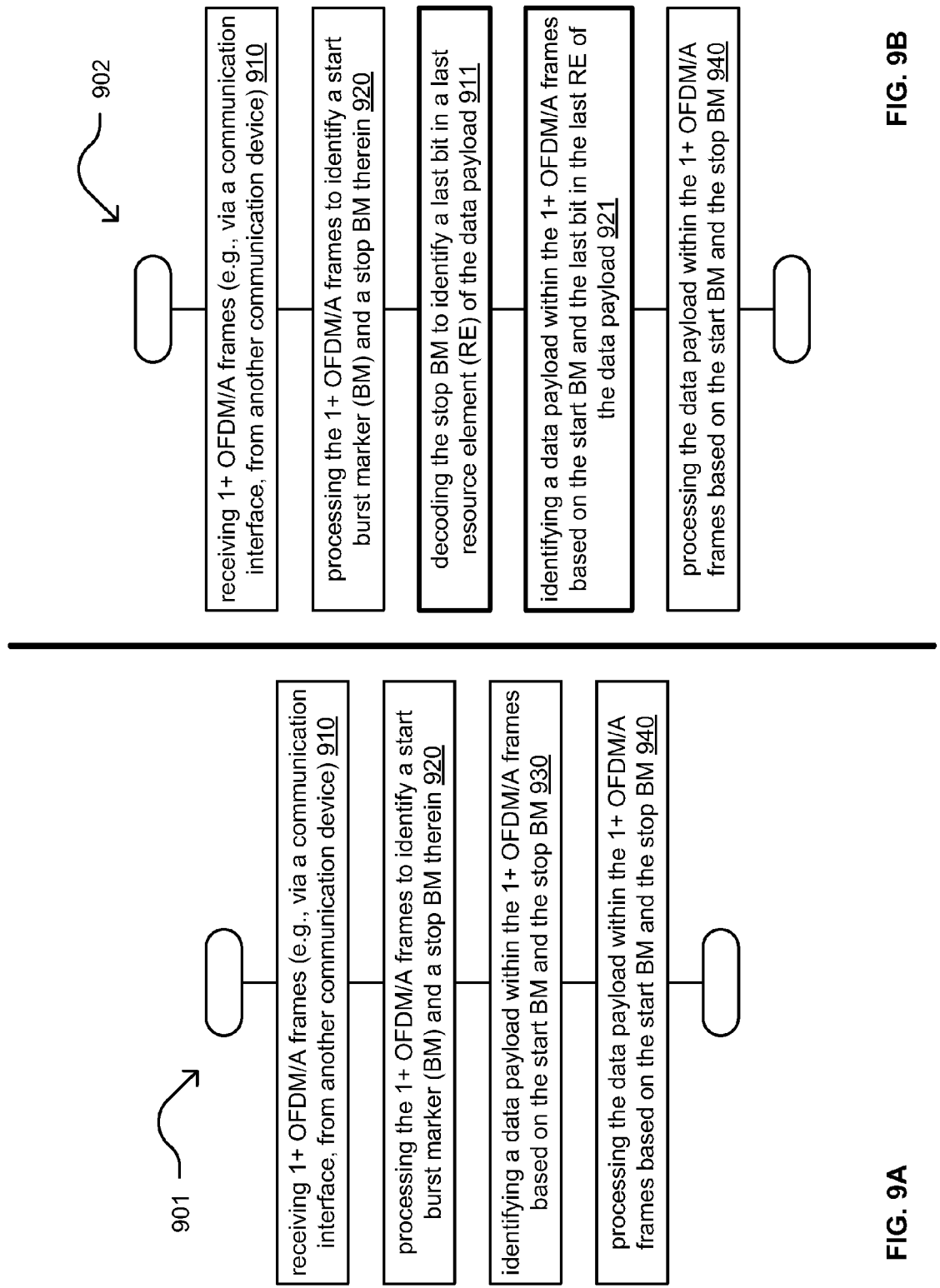
FIG. 9A is a diagram illustrating an embodiment of a method for execution by one or more communication devices.
FIG. 9B is a diagram illustrating another embodiment of a method for execution by one or more communication devices.

FIG. 9A is a diagram illustrating an embodiment of a method 901 for execution by one or more communication devices. The method 901 begins by receiving one or more OFDM/A frames (e.g., via a communication interface, from another communication device) (block 910). The method 901 continues by processing the one or more OFDM/A frames to identify a start burst marker (BM) and a stop BM therein (block 920).

The method 901 then operates by identifying a data payload within the one or more OFDM/A frames based on the start BM and the stop BM (block 930). The method 901 continues by processing the data payload included within the one or more OFDM/A frames based on the start BM and the stop BM (block 940). The data payload is locate between the start BM and the stop BM.

FIG. 9B is a diagram illustrating another embodiment of a method 902 for execution by one or more communication devices. The method 902 begins by receiving one or more OFDM/A frames (e.g., via a communication interface, from another communication device) (block 910). The method 902 continues by processing the one or more OFDM/A frames to identify a start burst marker (BM) and a stop BM therein (block 920).

The method 902 then operates by decoding the stop BM to identify a last bit in a last resource element (RE) of the data payload (block 911). The method 902 then operates by identifying a data payload within the one or more OFDM/A frames based on the start BM and the last bit in the last RE of the data payload (block 921). The method 902 continues by processing the data payload within the one or more OFDM/A frames based on the start BM and the stop BM (block 940).

Certain architectures of BM detectors are provided in the following diagrams.

Figure 10A:
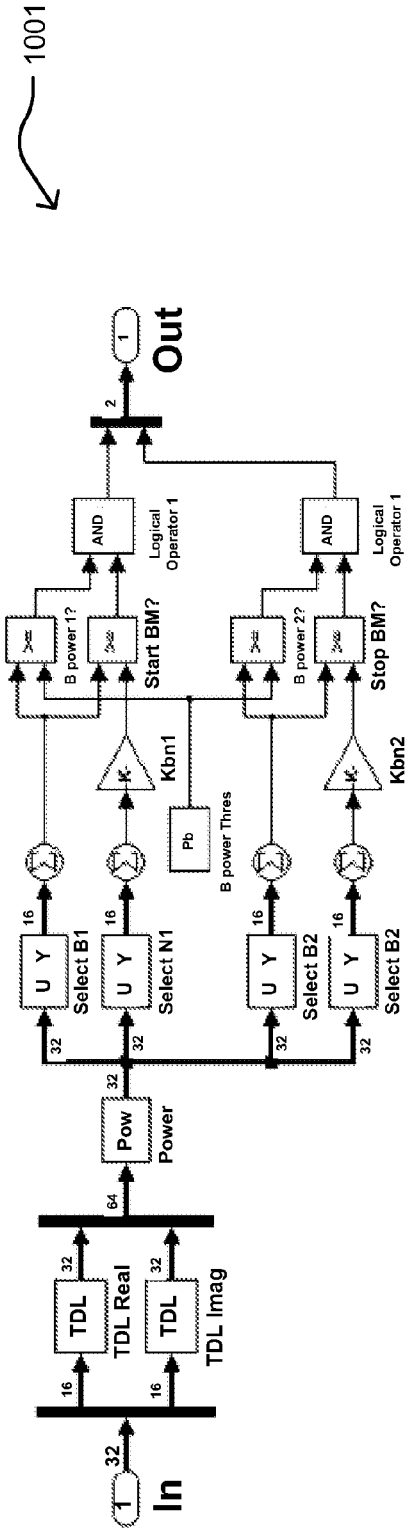
FIG. 10A is a diagram illustrating an example of a 2×16 BM size detector.

FIG. 10A is a diagram illustrating an example 1001 of a 2×16 BM size detector.

Figure 10B:
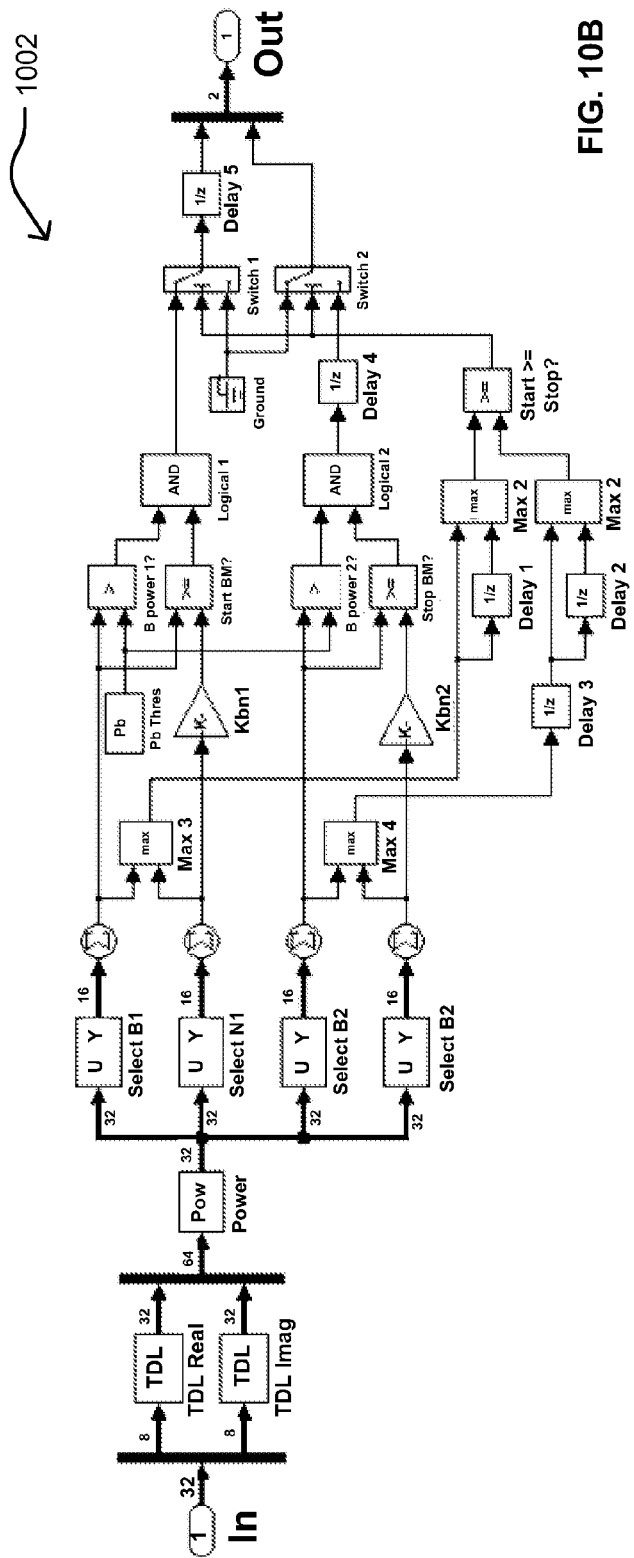
FIG. 10B is a diagram illustrating an example of a 4×8 BM size detector.

FIG. 10B is a diagram illustrating an example 1002 of a 4×8 BM size detector. This is an example of a 4×8 BM size detector with a circuit that operates to prevent simultaneous 2D start and stop BM trigger. This architecture provides for improved BM detection with a low false detection rate.

This disclosure presents various designed for 2D start and stop BMs including those having sizes of 4×8 and 2×16 with reference to FIG. 7A and FIG. 7B. Generally, any sized 2D start and stop BMs may be used such as described and depicted with reference to FIG. 4B and FIG. 4C. A BM Detector (e.g., with reference to FIG. 10A and FIG. 10B) operates using a predetermined sequence based on a data and null pattern. These architectures obviate any need for "S" correlators. In some examples, the 2D stop BM contains Reed-Solomon (RS) FEC protected data (e.g., 4×8 BM carries 8 information data bits in 24 encoded bits, and the 2×16 BM carries 12 information data bits in 28 encoded bits).

The BM data points to the last payload data bit in the last sub-carrier of the resource block before the stop BM. The RS FEC protects against burst errors in 1 or 2 consecutive OFDMA symbols (e.g., up to 99% of burst errors). Note that certain designs herein are such that the BM and payload data do not share resource blocks (RBs). BM construction with an equal number of "B" and "N" per symbol provides immunity to a false trigger from burst noise events.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
   a communication interface; and
   a processor, the processor and the communication interface configured to:
   generate at least one orthogonal frequency division multiplexing (OFDM) frame that includes a two-dimensional (2D) start burst marker (BM), a data payload, and a 2D stop BM, wherein:
   the 2D start BM indicates a start of the data payload and includes a first predetermined sequence that is located within a first plurality of adjacent sub-carriers within a plurality of adjacent OFDM symbols spanning a first OFDM frame of the at least one OFDM frame; and the 2D stop BM indicates an end of the data payload and includes a second predetermined sequence that is located within a second plurality of adjacent sub-carriers within the plurality of adjacent OFDM symbols spanning the first OFDM frame of the at least one OFDM frame or within another plurality of adjacent OFDM symbols spanning a second OFDM frame of the at least one OFDM frame; and transmit the at least one OFDM frame to another communication device.

2. The communication device of claim 1, wherein the processor and the communication interface are further configured to:

encode a plurality of data bits using a forward error correction (FEC) code to generate a plurality of encoded bits to indicate a position of a last bit in a last resource element (RE) of the data payload; and generate the 2D stop BM to include a first subset of elements of the second predetermined sequence based on the plurality of encoded bits and a second subset of elements of the second predetermined sequence based on data nulls.

3. The communication device of claim 1, wherein the processor and the communication interface are further configured to:

receive an optical signal via an optical communication link that supports time division multiple access (TDMA) communications;

convert the optical signal to an electrical signal, wherein the electrical signal includes the data payload arranged as a one-dimensional (1D) sequence of data bits; and map the 1D sequence of data bits of the electrical signal to a 2D data structure to generate the at least one OFDM frame that includes the 2D start BM, the data payload, and the 2D stop BM.

4. The communication device of claim 1, wherein:

the 2D stop BM includes the second predetermined sequence located within the second plurality of adjacent sub-carriers within the plurality of adjacent OFDM symbols spanning the first OFDM frame of the at least one OFDM frame;

the second OFDM frame is the first OFDM frame;

the first predetermined sequence includes a first set of 32 elements arranged across a first set of 4 adjacent sub-carriers and 8 adjacent OFDM symbols or a first set of 2 adjacent sub-carriers and 16 adjacent OFDM symbols; and the second predetermined sequence includes a second set of 32 elements arranged across a second set of 4 adjacent sub-carriers and the 8 adjacent OFDM symbols or a second set of 2 adjacent sub-carriers and the 16 adjacent OFDM symbols.

5. The communication device of claim 1, wherein:

the 2D stop BM includes the second predetermined sequence located within the second plurality of adjacent sub-carriers within the another plurality of adjacent OFDM symbols spanning the second OFDM frame of the at least one OFDM frame;

the first predetermined sequence includes a first set of 32 elements arranged across a first set of 4 adjacent sub-carriers and 8 adjacent OFDM symbols or a first set of 2 adjacent sub-carriers and 16 adjacent OFDM symbols within the first OFDM frame; and the second predetermined sequence includes a second set of 32 elements arranged across a second set of 4 adjacent sub-carriers and another 8 adjacent OFDM symbols within the second OFDM frame or a second set of 2 adjacent sub-carriers and another 16 adjacent OFDM symbols within the second OFDM frame.

6. The communication device of claim 1 further comprising:

a coax line terminal (CLT), and wherein the another communication device is a cable modem.

7. The communication device of claim 1 further comprising:

a cable modem, wherein the another communication device is a coax line terminal (CLT), a cable headend transmitter, or a cable modem termination system (CMTS).

8. The communication device of claim 1 further comprising:

the processor and the communication interface configured to support communications within at least one of a satellite communication system, a wireless communication system, a wired communication system, a fiber-optic communication system, or a mobile communication system.

9. A communication device comprising:

a communication interface; and a processor, the processor and the communication interface configured to:

receive a transmission that includes at least one orthogonal frequency division multiplexing (OFDM) frame from another communication device;

process the at least one OFDM frame to identify a two-dimensional (2D) start burst marker (BM) and 2D stop BM therein;

identify the 2D start BM within the at least one OFDM frame as being a first predetermined sequence that is located within a first plurality of adjacent sub-carriers within a plurality of adjacent OFDM symbols spanning a first OFDM frame of the at least one OFDM frame;

identify the 2D stop BM within the at least one OFDM frame as being a second predetermined sequence that is located within a second plurality of adjacent sub-carriers within the plurality of adjacent OFDM symbols spanning the first OFDM frame of the at least one OFDM frame or within another plurality of adjacent OFDM symbols spanning a second OFDM frame of the at least one OFDM frame; and identify a data payload within the at least one OFDM frame as being located between the 2D start BM and the 2D stop BM.

10. The communication device of claim 9, wherein the processor and the communication interface are further configured to:

decode a plurality of data bits of the 2D stop BM using a forward error correction (FEC) code to generate a plurality of decoded bits; and identify a position of a last bit in a last resource element (RE) of the data payload based on the plurality of decoded bits.

11. The communication device of claim 9, wherein:

the 2D stop BM includes the second predetermined sequence located within the second plurality of adjacent sub-carriers within the another plurality of adjacent OFDM symbols spanning the second OFDM frame of the at least one OFDM frame;

the first predetermined sequence includes a first set of 32 elements arranged across a first set of 4 adjacent sub-carriers and 8 adjacent OFDM symbols or a first set of 2 adjacent sub-carriers and 16 adjacent OFDM symbols within the first OFDM frame; and the second predetermined sequence includes a second set of 32 elements arranged across a second set of 4 adjacent sub-carriers and another 8 adjacent OFDM symbols within the second OFDM frame or a second set of 2 adjacent sub-carriers and another 16 adjacent OFDM symbols within the second OFDM frame.

12. The communication device of claim 9 further comprising:
a cable modem, wherein the another communication device is a coax line terminal (CLT), a cable headend transmitter, or a cable modem termination system (CMTS).

13. The communication device of claim 9 further comprising:
the communication interface configured to support communications within at least one of a satellite communication system, a wireless communication system, a wired communication system, a fiber-optic communication system, or a mobile communication system.

14. A method for execution by a communication device, the method comprising:
generating at least one orthogonal frequency division multiplexing (OFDM) frame that includes a two-dimensional (2D) start burst marker (BM), a data payload, and a 2D stop BM, wherein:
the 2D start BM indicates a start of the data payload and includes a first predetermined sequence that is located within a first plurality of adjacent sub-carriers within a plurality of adjacent OFDM symbols spanning a first OFDM frame of the at least one OFDM frame; and
the 2D stop BM indicates an end of the data payload and includes a second predetermined sequence that is located within a second plurality of adjacent sub-carriers within the plurality of adjacent OFDM symbols spanning the first OFDM frame of the at least one OFDM frame or within another plurality of adjacent OFDM symbols spanning a second OFDM frame of the at least one OFDM frame; and
transmitting, via a communication interface of the communication device, the at least one OFDM frame to another communication device.

15. The method of claim 14 further comprising:
encoding a plurality of data bits using a forward error correction (FEC) code to generate a plurality of encoded bits to indicate a position of a last bit in a last resource element (RE) of the data payload; and
generating the 2D stop BM to include a first subset of elements of the second predetermined sequence based on the plurality of encoded bits and a second subset of elements of the second predetermined sequence based on data nulls.

16. The method of claim 14 further comprising:
receiving an optical signal via an optical communication link that supports time division multiple access (TDMA) communications;
converting the optical signal to an electrical signal, wherein the electrical signal includes the data payload arranged as a one-dimensional (1D) sequence of data bits; and
mapping the 1D sequence of data bits of the electrical signal to a 2D data structure to generate the at least one OFDM frame that includes the 2D start BM, the data payload, and the 2D stop BM.

17. The method of claim 14, wherein:
the 2D stop BM includes the second predetermined sequence located within the second plurality of adjacent sub-carriers within the plurality of adjacent OFDM symbols spanning the first OFDM frame of the at least one OFDM frame;
the second OFDM frame is the first OFDM frame;
the first predetermined sequence includes a first set of 32 elements arranged across a first set of 4 adjacent sub-carriers and 8 adjacent OFDM symbols or a first set of 2 adjacent sub-carriers and 16 adjacent OFDM symbols; and
the second predetermined sequence includes a second set of 32 elements arranged across a second set of 4 adjacent sub-carriers and the 8 adjacent OFDM symbols or a second set of 2 adjacent sub-carriers and the 16 adjacent OFDM symbols.

18. The method of claim 14, wherein the communication device is a coax line terminal (CLT), and the another communication device is a cable modem.

19. The method of claim 14, wherein the communication device is a cable modem, and the another communication device is a coax line terminal (CLT), a cable headend transmitter, or a cable modem termination system (CMTS).

20. The method of claim 14 further comprising:
operating the communication interface of the communication device to support communications within at least one of a satellite communication system, a wireless communication system, a wired communication system, a fiber-optic communication system, or a mobile communication system.

* * * * *